Dec. 18, 1945.  C. W. MOTT  2,391,100
CONNECTING PIN HOLDER
Filed Aug. 9, 1943
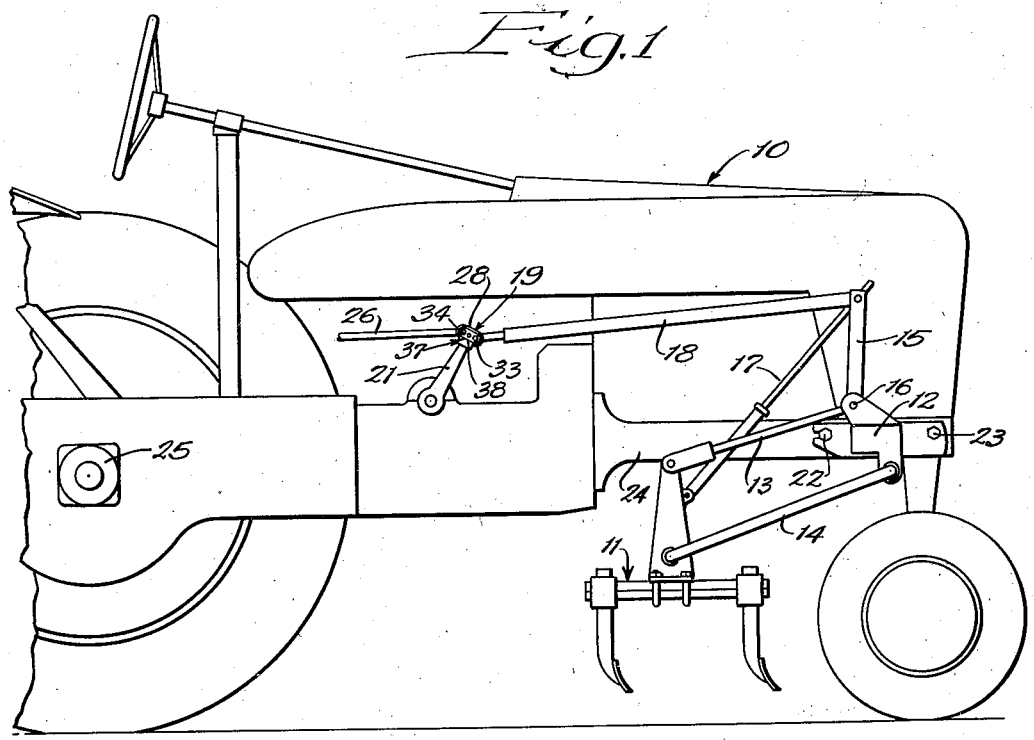
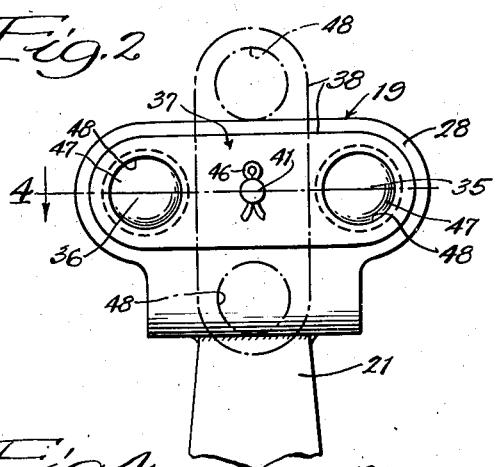
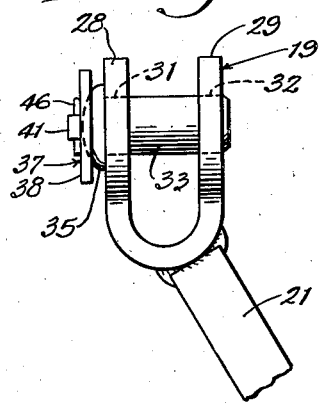
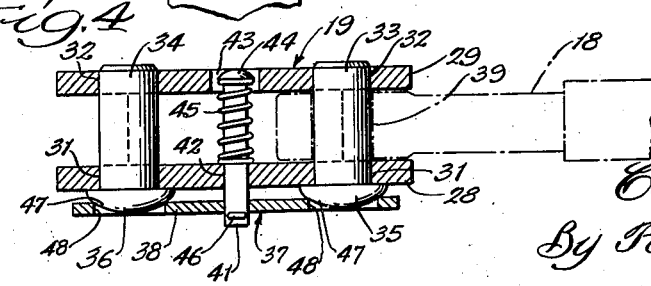
Inventor:
Carl W. Mott,
By Paul O. Pippel.
Attorney.

Patented Dec. 18, 1945

2,391,100

UNITED STATES PATENT OFFICE 2,391,100

CONNECTING PIN HOLDER

Carl W. Mott, La Grange, Ill., assignor to International Harvester Company, a corporation of New Jersey Application August 9, 1943, Serial No. 497,960

2 Claims. (Cl. 85—5)

This invention has to do with a connecting pin-holder used in conjunction with a pin removably disposed in relatively movable parts for pivotally connecting them together. The invention is particularly useful for releasably retaining a connecting pin in assembly between a rock-shaft and the links of tools to be manipulated thereby.

An important general object of the invention is the provision of a novel inexpensively-produced device capable of convenient assembly as upon the bifurcated head of an operating arm for releasably blocking the retraction of a connecting pin from connection between such head and a portion of a connecting link placed between the opposed walls of such head.

Another object is the provision of a device as the aforesaid in which a pin-blocking member is yieldably displaceable axially of the connecting pin preparatory to movement laterally of the pin out of blocking relation therewith.

Another object is the provision of a pin-holding device together with means for preventing lateral displacement of its blocking member from blocking relation with the pin until there has been retractive movement of the blocking member axially of the pin, and a spring urging the blocking member in the opposite axial direction.

A further object is the provision of a pin-holding device according to the next preceding object, wherein the spring tends to advance the blocking member into engagement with a portion of the support therefor to retain the blocking member out of registry with a pin that is being inserted or withdrawn.

These and other desirable objects inherent in and encompassed by the invention will be better understood by reading the ensuing description with reference to the drawing, wherein:

Fig. 1 is a side elevational view of a tractor employing a preferred form of the invention in a connection between a rock-shaft thereon and an operating link for a tool rig pivotally connected to the tractor;

Fig. 2 is an enlarged fragmentary view showing the upper end of a rock-shaft arm, also shown in Fig. 1, together with an attaching structure including a pin-holder assembly embodying the invention;

Fig. 3 is an end view of the structure shown in Fig. 2; and

Fig. 4 is a horizontal sectional view, taken on the line 4 of Fig. 2, and further illustrating in dot-dash lines the association of one of the links between the walls of the bifurcated head of the rock-shaft arm.

With continued reference to the drawing, the invention is illustrated as it may be employed in conjunction with a tractor 10 having a tool rig 11 pivotally connected to a bracket 12 on the tractor by means of parallel links 13 and 14. A lever 15 is also pivoted on the bracket 12 coaxially with the link 13 about a pivotal support 16. A rod 17 is connected between the upper end of the arm 15 and the tool rig, so that pivotal movement of the arm 15 about the axis at 16 will be operative through the rod 17 for causing the rig 11 to be raised or lowered. Pivotal movement of the arm 15 is accomplished by imparting endwise movement to a link 18 connected to the upper end of said arm 15.

When the back end of the link 18, the left hand end as viewed in Fig. 1, is disconnected from an attaching head 19 upon the upper end of a rock-shaft lever 21, as will be explained presently, this link 18, together with the bracket 12, links 13 and 14, and the tool rig 11, which form an implement unit, may be detached from the tractor following loosening of bolts 22 and 23 which detachably connect the bracket to a sill 24 extending along a side of the tractor.

A rear implement including a tool rig (not shown), corresponding to the tool rig 11, may be detachably associated with the tractor rear axle housing 25. An operating link 26 comprising a part of said rear implement is connected to the upper end of the rock-shaft arm 21 in the same manner that the operating link 18 is connected therewith.

Referring more particularly to Figs. 2 to 4, the opposed walls 28 and 29 of the attaching head 19 can be seen to contain pin-receiving sections in the form of holes 31 and 32. There are two holes 31 in the wall 28, and two holes 32 in the wall 29. Connecting pins 33 and 34 are insertable in these axially alined pairs of holes, as illustrated in Fig. 4. The pin 33 has a head 35 and the pin 34, a head 36.

Referring more particularly to the pin 33, when a spring-urged pin-blocking means 37 comprising a blocking plate 28 is rotated into the dot-dash line position of Fig. 2, and following insertion of the back end of the link 18 between the walls 28 and 29, as illustrated in Fig. 4 by dot-dash lines, said pin 33 may be advanced axially inwardly through the hole 31 and thence through a pin-receiving portion in the form of a hole 39 in the link 18 and into the hole 32 in the wall 29 for connecting the link 18 to the attaching head 19 in a conventional manner. The pin 34 is likewise associatable with the link 26 for connecting the latter with the attaching head.

The present invention involves the spring-urged blocking means 37 for resisting retractive movement of the pins 33 and 34 from their connecting assembly with the links 18 and 26. This spring-urged means comprises the blocking plate 38 and a stem 41 connected with said plate and extending through holes 42 and 43 in the walls 28 and 29. The hole 42 serves as a bearing in which the stem 41 is axially movable, whereas the hole 43 is over-size with respect to a head 44 upon the inner end of the stem. An expansion spring 45 is coiled about that portion of the stem between its head 44 and the inner side of the wall 28 for expansively reacting between these parts to urge the blocking plate 38 inwardly against the outer face of the wall 28 when this plate is rotated into the dot-dash line position of Fig. 2, or to urge said plate against the heads of the pins 33 and 34 when the plate is turned into the full line position of Fig. 2 for registering parts thereof with these pin-heads. A cotter pin 46 prevents the plate 38 from slipping off of the outer end of the stem 41. While the blocking plate 38 occupies the full line positions of Figs. 2, 3, and 4, it presses against the heads of the pins 33 and 34 to prevent accidental retraction of these pins out of their connecting relation between the attaching head and the links 18 and 26.

The spring 45, in addition to impinging the blocking plate against the heads of the pins 33 and 34 for preventing their accidental dislodgment, serves the further function of nesting interlocking portions 47 and 48 of the pin-heads and blocking plate, so that these portions will function as restraining means preventing accidental lateral movement of the blocking plate from registry with the pins 33 and 34. These interlocking portions 47 and 48 respectively consist of portions of the pin-heads 35 and 36 and of holes adjacently to opposite ends of the elongated blocking plate.

After assembly of the links 18 and 26 with the attaching head, disassembly is accomplished by manually grasping the blocking plate 38 at opposite of its edges, to first retract this plate outwardly axially of the pins 33 and 34 to dissociate the interlocking portions 47 and 48, and by thereafter rotating this plate and the stem 41 until the plate is in the dot-dash line position of Fig. 2. Thereafter the pins 33 and 34 may be withdrawn. Meanwhile, the spring 45 presses the inner face of the plate 38 against the outer face of the wall 28 to prevent turning of the plate, so it remains out of registry with the holes 31 without further attention of the operator while the pins 33 and 34 are being withdrawn and when they are subsequently reinserted. Following reinsertion of the pins 33 and 34 either with or without links 18 and 26 (which may be of different implements) disposed between the attaching head walls 28 and 29, the blocking plate will again be grasped at opposite of its edges and this time rotated 90° to the full line position in Fig. 2, and thereafter released so the spring 45 can press the plate 38 against the pins for preventing their accidental displacement.

The invention is particularly useful in so far as it expedites the attachment and detachment of a plurality of alternatively employable implements. Each of these implements can include its own operating link, as 18 or 26, and this link need only have a hole, as 39, in the end at which it is to be connected with the attaching head. The pins 33 and 34 always remain associated with the rock-arm upon the tractor. The spring 45 and the blocking plate 38 are conveniently instantly available for holding the pins associated with the head whether any implements are mounted upon the tractor or not. Consequently, the inconvenience often experienced by the loss of a connecting pin is greatly minimized.

While I have herein shown and described a preferred embodiment with the view of illustrating the invention, it should be understood that the invention extends to other forms, arrangements, structures, and details falling within the scope and spirit thereof and not sacrificing all of its material advantages.

What is claimed is:

1. In an attaching structure for connection with a member having a pin-receiving portion, an attaching head having opposed walls for the reception of said pin-receiving portion therebetween, said walls having pin-receiving sections, a headed pin advanceable in the section of one of said walls and through the pin-receiving portion of said member into the other of said sections for connecting said member with the attaching head while the pin-head is disposed upon the outer side of the one wall, a pin-blocking member having a stem mounted in the one wall for endwise movement transversely of said walls and having a spring-holding portion in the space between said walls, a spring about said spring-holding portion and exerting a force thereon, while reacting against a portion of the attaching head, for urging the blocking member inwardly toward the outer side of the one wall, said blocking member being pivotable about the axis of said stem to selectively dispose a portion of the blocking member in axial registry with the pin where abutment with the pin will prevent accidental retraction thereof or to dispose the blocking member out of such registry to facilitate retraction of the pin, and restraining means for the blocking member and operable, when the blocking member is held inwardly by said spring, for axial abutment with the pin to prevent accidental displacement of said blocking member laterally from the pin.

2. In an attaching structure for detachably connecting an apertured link with an operating arm having a bifurcated head having walls spaced to receive the apertured portion of the link therebetween and in which walls there are axially alined holes, a headed pin advanceable in a hole of one wall through the aperture in the link into an alined hole in the other wall while the head of said pin is disposed upon the outer side of the one wall, a pin-blocking member having a stem mounted in the one wall for endwise movement transversely of said walls and having a spring-holding portion in the space between said walls, a spring about said spring-holding portion and exerting a force thereon, while reacting against a portion of the bifurcated head, for urging the blocking member inwardly toward the outer side of the one wall, said blocking member being pivotable about the axis of said stem to selectively dispose a portion of the blocking member in axial registry with the pin where abutment with the pin will prevent accidental retraction thereof or to dispose the blocking member out of such registry to facilitate retraction of the pin, and restraining means for the blocking member comprising a portion thereon nestable axially complementally with the pin-head, when the blocking member is moved inwardly by the spring, for abutment with the pin to prevent accidental displacement of the blocking member laterally from the pin.

CARL W. MOTT.